Figure 1:
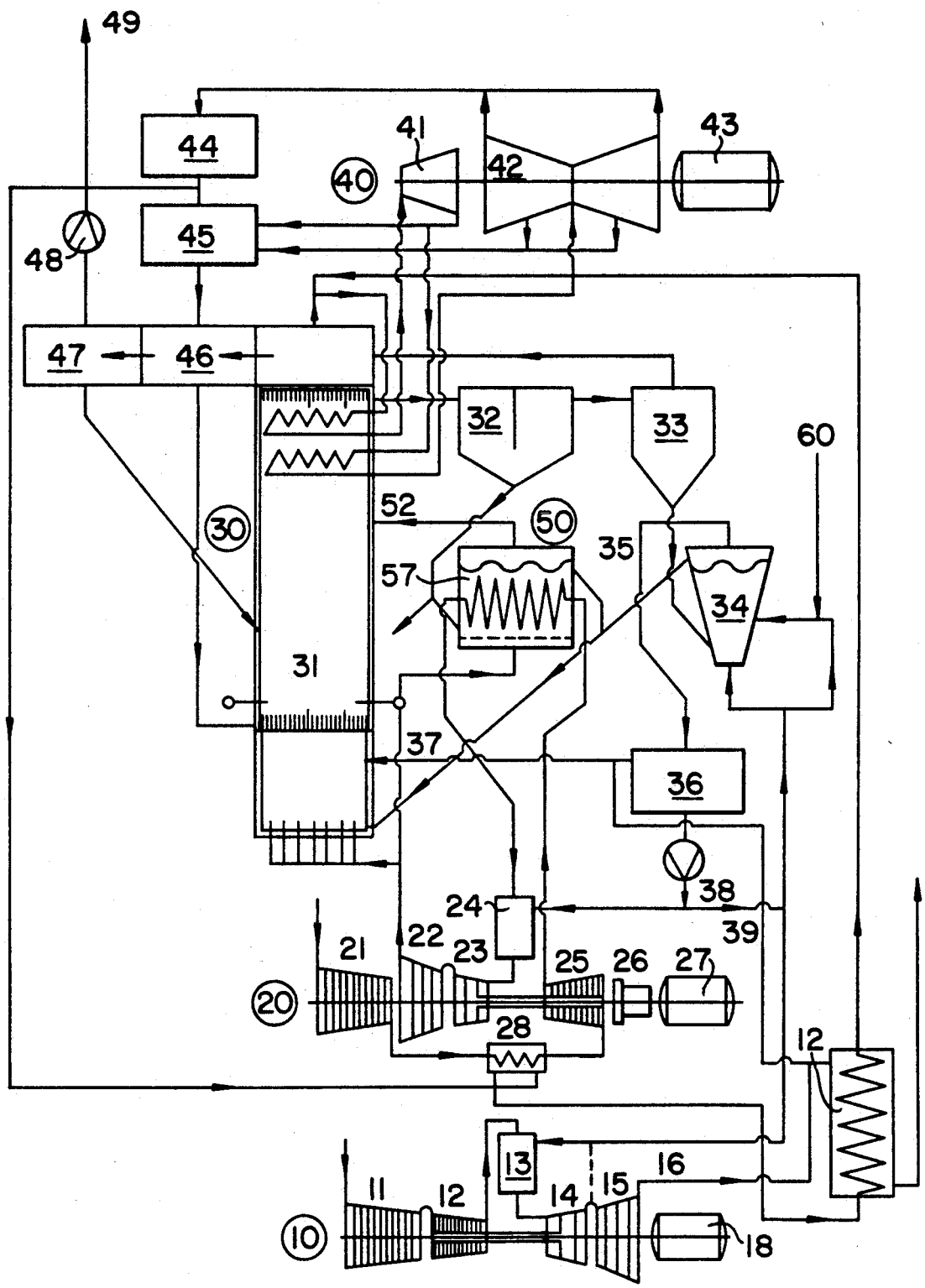

United States Patent [19]
Collin et al.

[11] Patent Number: 5,241,825
[45] Date of Patent: Sep. 7, 1993

[54] PROCESS FOR GENERATING ELECTRIC POWER

[76] Inventors: Per Collin, Orrspelsvte, uml/a/ gen 4, S-182 75 Stocksund; Måns Collin, Telegrafgatan 33, S-149 00 Nynäshamn, both of Sweden

[21] Appl. No.: 820,604
[22] PCT Filed: May 28, 1990
[86] PCT No.: PCT/SE90/00355
  § 371 Date: Jan. 22, 1992
  § 102(e) Date: Jan. 22, 1992
[87] PCT Pub. No.: WO90/14504
  PCT Pub. Date: Nov. 29, 1990

[30] Foreign Application Priority Data

May 26, 1989 [SE] Sweden ............................. 8901893

[51] Int. Cl.⁵ ............................................. F01K 23/04
[52] U.S. Cl. ............................. 60/655; 10/39.182
[58] Field of Search .................... 60/39.182, 655

[56] References Cited

U.S. PATENT DOCUMENTS 4,896,498 1/1990 Knizia ................... 60/39.182 X
4,996,836 3/1991 Reh et al. ............... 60/39.182 X

FOREIGN PATENT DOCUMENTS 2095762 10/1982 United Kingdom .

Primary Examiner—Ira S. Lazarus
Assistant Examiner—L. Heyman
Attorney, Agent, or Firm—Michael N. Meller

[57] ABSTRACT

Electrical energy is produced from solid fuels in an ACFBC steam generator with two gas turbines and a steam turbine. The fuel is pyrolyzed in a fluid pyrolysis bed (34) with a hot partial flow of the bed material from the ACFBC steam generator (30), which together with the formed pyro coke is returned to the generator (30) as a fuel. The formed pyro gas (35) is combusted in one of said gas turbines (10), the exhaust gas (16) from which is used for steam generation (17). The other gas turbine (20) is operated with compressed air from its high pressure compressor (22) partially heated in a heat exchanger (51) in a fluid bed (50) with a controlled partial flow of hot bed material from said generator (30). The compressed air is finally heated by burning (24) fuel directly therein, and the exhaust gas from the power turbine part (22) is used as combustion air in the generator (30) which produces super heated high pressure steam for the steam turbine (40).

21 Claims, 1 Drawing Sheet

PROCESS FOR GENERATING ELECTRIC POWER

The presently most environment-friendly process for generating electric power based on the combustion of solid fossil fuels, such as coal, comprises burning the fuel in a finely divided form in a steam generator of the type ACFBC (atmospheric circulating fluid bed combustion) with the addition of finely divided lime stone and/or dolomite. Since it is possible to carry out ACFBC with >99% of fuel efficiency at such a low temperature as 850° C. the NOx formation is very low and simultaneously >90% of the content of sulphur in the fuel can be bonded to the lime formed by the combustion.

By operating the steam generator at a high pressure, such as 145 bars, and a steam temperature of 535° C. electric power can be generated in a condensor steam turbine with a net efficiency of about 38%.

In order to achieve a higher efficiency, concepts have been developed based on combinations of gas and steam turbines with combustion in a steam generator under pressure, so-called PFBC (pressurized fluid bed combustion). The flue gases from the pressurized fluid bed are after multi step cyclone cleaning used directly in a gas turbine, and the exhaust gases from said turbine are used for generating a certain quantity of steam. The main steam generation is, however, performed in tube panels arranged in the fluid bed and its walls. With a PFBC concept it is possible to reach with condensation an actual net efficiency of about 42%, whereby about 20% of the electric power is generated in the gas turbine.

The drawbacks of a PFBC concept are partly a comparatively higher bed temperature (880° C.) which means a higher NOx production, and partly a risk for blade failure in the gas turbine in case the cyclone cleaning fails, and a substantial complication of the operation because of the unavailability for inspection and repair caused by enclosing the fluid bed and cyclones in the pressure chamber.

The instant invention constitutes an environment-friendly method for producing electric power with a net efficiency of about 46% based on combustion of solid fossile fuels in a steam generator of the type ACFBC in combination with two gas turbines and a condensor steam turbine. The concept according to this invention thus gives a substantially higher net efficiency than the PFBC concept although it is less complicated from a mechanical as well as an operational point of view.

The method according to this invention is characterized in that the fossile fuel, which suitably comprise >20% and preferably >30% of volatiles, is first pyrolyzed in a finely comminuted form in contact with hot bed material in a fluid bed through which flows a controlled partial flow of the circulating bed material flow f an ACFBC steam generator, which partial flow combined with formed char is recirculated to the combustion chamber of the steam generator where the char is used as fuel, whereas the produced pyro gas, after per se known cleaning, is used in a gas turbine unit, and the exhaust gas from said unit is used, suitably after reheating, for generating steam, preferably high pressure steam, whereas the other gas turbine unit is operated with compressed air from the high pressure compressor of the unit, which air is heated indirectly in a heat exchanger submerged in a classical type fluid bed through which flows a controlled partial flow of the circulating bed material flow of the ACFBC steam generator, the final heating of said compressed air being performed by burning directly therein a gaseous and/or liquid fuel, suitably internally produced such a fuel, especially pyro gas, and wherein said gas turbine unit is operated with back pressure by using the exhaust gas from the power turbine part thereof, which has a comparatively high temperature, as fluidizing gas (primary air) and secondary combustion air in the ACFBC steam generator when producing there superheated high pressure steam for the condensor steam turbine unit.

The invention is also characterized by performing the separation of the bed material from the hot flue gas suspension, usually comprising 10–80 kg/m$^3$ of bed material, which leaves the top of the combustion chamber of the ACFBC steam generator, in two steps: a "coarse separation step" wherein the content of bed material in the suspension is decreased with 60–90%, and a "fine separation step" wherein the content is reduced to <3% of the original content of bed material in the suspension, wherein the material from the "coarse separation step" is introduced under the bed surface in the fluid bed with the heat exchanger and is returned through an overflow to the lower part of the combustion chamber of the steam generator, and wherein the fluid bed in question is fluidized at $0.6 < \epsilon < 0.7$ ($\epsilon =$ void volume/total volume) with the aid of a small partial flow of the exhaust gas flow from the power turbine part of the back pressure gas turbine, whereas the material from the "fine separation step" is fed to the fluid pyrolysis bed, suitably at the bottom thereof, and the mixture of formed char and bed material is recirculated through an overflow to the lower part of the combustion chamber of the steam generator.

The pyrolysis of the finely-divided fossile fuel is according to the invention performed by blowing the fuel into the lower part of the fluid pyrolysis bed, preferably at several points, said blowing being performed with the aid of a gas which is essentially inert against the fuel, and simultaneously the raw pyro gas formed in the bed fluidizes the bed and is removed from the top of the bed chamber and is subjected to coarse cleaning in a hot cyclone. From the hot cyclone the gas is passed to per se previously known cleaning devices where dust and tar are removed, e.g. by washing. The recovered tar etc. is suitably used as a fuel in the combustion chamber of the steam generator and for the reheating of the exhaust gas from said gas turbine unit.

An example of the invention is disclosed below with reference to FIG. 1 as a detailed illustration thereof.

This example is related to a power generating plant with a net effect of 130 MW based on coal containing 37.0% of volatiles and with an effective heat value of 7800 Kcal/kg of dry raw coal and with the following analysis:

|   | C | H | O | N | S |
|---|---|---|---|---|---|
| % | 79.3 | 5.4 | 8.9 | 1.5 | 0.6 |

The ash content of the sample was 4.3%.

In a standard coal powder mill apparatus (not disclosed on FIG. 1) 9.1 kg/s of dry raw coal are grinded to a grain size of <0.1 mm. Drying s performed during grinding, suitably with exhaust gases from the exhaust gas boiler (waste heat boiler) 17. The coal powder 60 is injected with the aid of cleaned pyro gas 38 in the lower part of the pyrolysis beds 34, one for each of the hot cyclones 33 which are connected in parallel. The pyrolysis beds 34 have the shape of an upside down truncated cone (venturi bed) and are at the bottom supplied with controlled partial flows of hot bed material (about 835° C.) which has been separated from the bed material circuit of the ACFBC steam generator in the cyclones 33. Said partial flows are returned to the lower part of the combustion chamber 31 of the steam generator 30 through an overflow in the upper part of the pyrolysis beds. The bed material in the pyrolysis beds 34 is stirred from the bottom with the aid of small gas flows, suitably with cleaned pyro gas 38 which is supplied so that upward streams are formed in the central parts of the bed and downward streams along the bed wall. Fluidizing per se is caused by the raw pyro gas evolved when the coal gets into contact with the bed material.

In contact with the hot bed material the finely-divided dry coal is pyrolyzed very quickly and converted to char and raw pyro gas which is removed from the top of the beds 34. The raw gas is to begin with freed from the main part of the entrained bed material in the hot cyclones (not shown in FIG. 1) and is thereafter cooled and washed free from dust and tar 36 in a way known per se from cokery technology. The main fraction of the tar 37 with a minor content of bed material is used as fuel in the combustion shaft 31 of the steam generator 30 whereas a pure fraction 39 is used for reheating the exhaust gas 16 from the gas turbine unit 10 prior to the use thereof in a waste heat boiler 17 producing saturated high pressure steam.

The main part (about 84%) of the cleaned pyro gas 38 is used as a fuel in the standard gas turbine unit 10 where it is burnt in the combustion chamber 13 at a pressure of 12 bars in 92 kg/sec. of compressed air from the high pressure compressor 12. The generated hot (900° C.) gases from the combustion chamber 13 expand in the two steps of the turbine 14 which drives the high and low pressure compressors 12 and 11 resp. The exhaust gas from the turbine 12 drives the power turbine 15 which is connected to the generator 18 with an output of 16,400 kWe.

The exhaust gases 16 from the power turbine 15 have a temperature of about 360° C. and must, for the most economical use, be reheated to about 450° C. which makes possible the use in a waste heat boiler 17 in which it is then possible to generate saturated high pressure steam of 145 bars and 338° C., which is super heated in the super heater of the ACFBC steam generator. 30% of the tar separated in the cleaning device 36 is used up for said reheating.

The minor part of the pyro gas (about 14%) is used as fuel for the modified gas turbine unit 20, in the combustion chamber 24 of which it is used for final heating of the hot pressurized air from the heat exchanger 51 to 900° C. In the heat exchanger 51 in the classical fluidized bed 50 the compressed air from the high pressure compressor 25 (11 bars, 325° C.) is heated indirectly to about 800° C. Through the fluidized bed 50 flows a controlled flow of hot (about 840° C.) bed material which has been branched off from the recirculation circuit of the ACFBC steam generator 30 in the "coarse step" 32 and is reintroduced into the fluid bed 50 close to the bottom thereof and is recirculated through an overflow to the lower part of the combustion chamber 31 of the steam generator 30.

The hot pressure gas of the combustion chamber 24 is depressurized in the two steps of the turbine 23, of which the first step drives the high pressure compressor 25 and the second step through a gear 26 drives the generator 27 with an output of 13,600 kWe. The exhaust gas from the turbine 23 drives the power turbine 22 which drives the low pressure compressor 21 from which the low pressure air is supplied to the high pressure compressor 25 through an intermediate cooler 28. In said cooler the heat of compression is recovered e.g. for preheating the feed water to the waste heat boiler 17.

The heat comsumption in the fluid bed 50 for the indirect heating of the compressed air from the high pressure compressor 25 is substantially larger than the heat consumption in the pyrolysis beds 34. For obtaining a suitable ($<30°$ C., preferably $<10°$ C.) temperature decrease of the bed material in the pyrolysis beds 34 the distribution of the bed material between the separation steps 32 and 33 is according to the invention controlled. Said control is achieved preferably by using in the "coarse step" 32 a separating device which gives a degree of separation which is too high, and in a controlled by-pass (not shown on FIG. 1) a required flow of suspension is by-passed to the "fine step" 33.

The heat content of the flue gas from the cyclones 33, which is almost free from bed material, is used in the steam generator 30 and its economiser 46. After the final cleaning in the dust bag filter 47 the flue gases are expelled to the atmosphere 49 at about 120° C. after a pressure increase in the blower 48.

The lower effect from the gas turbine unit 20 compared with the unit 10 which is essentially identical therewith as regards its components, is caused by the fact that the power turbine 22 of the unit 20 operates with ~400 mbars back pressure since the exhaust gas therefrom, about 86 kg/sec (about 480° C.), is used as fluidizing gas (primary air) and secondary combustion air in the combustion chamber 31 of the ACFCB steam generator 30, which gives an air surplus of e.g. 10%. A small partial flow of the exhaust gas from the power turbine 22 is used as fluidizing gas in the fluid bed 50, which operates at $0.6<\epsilon<0.7$, and the gas is therefrom passed to the combustion chamber 31.

The saturated high pressure steam (145 bars, 338° C.) from the steam generator 30 and the waste heat boiler 17 is superheated in the steam generator to 535° C. and is fed to the high pressure part 41 of the steam turbine unit 40. About 85% of the exhaust steam therefrom 34 bars, 328° C.) is resuperheated in the steam generator 30 to 535° C. and the pressure is decreased in the low pressure part 42 against a vacuum in the condensor 44, whereas the rest, including a certain amount of bleed-off steam from the low pressure part, is used for feed water preheating 45. The turbine generator 43 thereby gives an output of 102,300 kWe.

With subtraction for feeder pumps etc. with 2,300 kWe the combined power plant thus according to the example of the invention gives an output of 130 MWe which amounts to a net efficiency of 45.6%—a substantially higher efficiency than what can be achieved with the PFBC concept.

The coal on which the example is based comprises 37% of volatiles which means that 23% of the electric power production can be performed in the gas turbine units 10 and 20. If coal with 40% of volatiles is used the percentage of the electric power generated in the gas turbine units increases to above 23% which means that the net efficiency will amount to >46%.

If a power plant operating according to the method of this invention is based on coal with e.g. 40% of volatiles and the gas turbines 10 and 20 resp. designed for this, and it were for some reason possible to supply the plant only with coal with e.g. 30% of volatiles, the efficiency would decrease and the gas turbine units could not be used at an optimum. In such a case it is, although the oil calories are more expensive, economically motivated to add oil to the pyrolysis in a quantity corresponding to the volatile substances which are lacking in the supplied coal.

A power plant according to this example gives in a per se known way a desired low release of $SO_2$ by adding a controlled flow of finely-divided lime-stone to the combustion chamber 31 of the steam generator 30 where CaO formed binds $SO_2$ as $CaSO_4$. For obtaining a desired low release of $SO_2$ a controlled surplus of CaO is maintained in the bed material recirculation circuit to the steam generator 30.

The pyro gas 35 from the pyrolysis beds 34 is substantially free from S since the equilibrium $$CaO + H_2S \rightleftharpoons CaS + H_2O$$

is displaced very far to the right at 830° C. About 60% of the S which is fed to the pyrolysis beds with the coal is present in the char, about 7% in the tar and about 30% is bonded as CaS in the bed material leaving the pyrolysis beds 34.

Since only 30% of the tar, containing about 2% of the S fed into the system with the coal, is used for reheating the exhaust gas from the turbine unit 10, 98% of the S supplied bonded to the char, tar and CaS is introduced into the combustion shaft 31 of the steam generator 30 where it is combusted at 850° C. in the presence of CaO. This means that the power generation according to the invention requires marginally larger addition of finely-divided lime-stone compared with conventional ACFBC for obtaining the same low $SO_2$ release in the expelled flue gas.

The formation of NOx in the combustion of fossil fuels increases heavily with the combustion temperature but also with the concentration of $O_2$. Thus, for example, the content of NOx in the flue gas from the combustion of coal powder in a burner of the multi-step type amounts to 400-500 mg NOx/Nm$^3$ with an air excess of 50% which is normal for powder firing. With a carefully operated ACFBC <80 mg NOx/NM$^3$ can be maintained because of the low combustion temperature (850° C.) and the low excess amount of air required for a high burn-out (about 99%).

Since the formation of NOx in ACFBC to >50% originates from the content of organically bonded N in the fossil fuel and about 35% thereof is expelled as $N_2$ and $NH_3$ in the pyrolysis, the supply of organically bonded N to the combustion chamber 31 of he steam generator 30 is lower in the power generation according to this invention, which gives the result that the content of NOx in the flue gas will remain at <60 mg/Nm$^3$.

According to the example of this invention about 12% of the generated electric power is obtained in the gas turbine unit 10 which uses cleaned pyro gas as fuel. The exhaust gas 16 from the unit 10 comprises about 300 mg NOx/Nm, if no particular measures are taken. About 80% of the discharge of NOx can, however, easily be eliminated in a per se known manner by adding $NH_3$ in the molar ratio $NH_3NOx \sim 0.8$ to the 360° C. hot exhaust gas 16 and passing the gas mixture over a per se known catalyst. The exhaust gas thereafter will contain about 60 mg NOx/Nm$^3$ at an excess of about 5 mg $NH_3$/Nm$^3$.

The $NH_3$ obtained in the pyrolysis of the fossil fuel is resent in the tar-water phase from the cleaning 36 of the raw pyro gas and can easily be recovered therefrom and used for the denoxing operation mentioned above. According to the example about 15 g $NH_3$/sec.cante recovered from the tar water. The denoxing operation treatment of the exhaust gas 16 requires about ⅔ thereof and the rest is sufficient for decreasing the NOx content in the flue gas from the ACFBC steam generator 30 from about 60 to 10-15 mg NOx/Nm$^3$, if desired.

A special advantage of the addition of NH, to the flue gas from the ACFBC steam generator 30 is that the content of $N_2O$ in the flue gas, which according to the latest results is substantial with ACFBC, is decreased substantially. This is essential since $N_2O$ contributes to the so-called green-house effect in the same high degree as CFC (chlorofluoro carbons) and also to the decomposition of the ozon layer, wherein the relative importance of $N_2O$ compared with CFC is 1:4.

If in a per se known manner the combustion chamber 13 of the gas turbine unit 10 is supplied with steam, e.g. bleed-off steam at 15 bars from the low pressure part 42 of the steam turbine unit 40, at a flow corresponding to 0.07 kg/Mca supplied fuel, the NOx content in the exhaust gas 16 will decrease to about 150 mg/Nm$^3$ and simultaneously the output effect increases with about 2.5%. Since the output effect from the low pressure part 42 of the steam turbine 40 simultaneously decreases somewhat because of the bleed-off, the net effect increase will be about 1%. The addition of $NH_3$ to the exhaust as 16 in the proportions mentioned above causes in this case a decrease of the NOx content therein to about 30 mg/Nm$^3$, and the average NOx content in the two flue gas flows from the power plant according to the example after denoxing with the aid of internally produced $NH_3$ will amount to <20 mg/Nm$^3$—a particularly low and environment-friendly level.

As a summary, the electric power generation based on solid fossil fuels according to this invention gives the following substantial advantages:

a very high net efficiency which for 40% of volatiles in the coal feed exceeds 46%, a desired low discharge of $SO_2$, a low NOx discharge or a very low discharge if internally produced $NH_3$, is used for denoxing in a per se known manner.

We claim:

1. An environment-friendly process for generating electrical energy with very high efficiency on the basis of combustion of solid fuels, selected from the group consisting of fossil fuels and other solid fuels containing over 20% of volatiles, in an ACFBC steam generator combined with two gas turbine units and a steam turbine, unit, wherein said solid fuel (60) is first pyrolyzed in a finely-divided form in contact with hot bed material in a fluid pyrolysis bed (34) through which flows a controlled partial flow of said hot bed material from the circulating flow of said ACFBC steam generator (30), which partial flow mixed with formed char is returned to a combustion chamber (31) of said steam generator (30), in which chamber said char acts as a fuel, whereas pyro gas is (35) formed, after cleaning (36) contaminants such as dust or tar from said pyro and is used as a fuel on one of said gas turbine units (10), an exhaust gas (16) from said unit being used for generating steam (17), having a high pressure compressor (22) provide compressed air, heating said compressed air partially and indirectly in a heat exchanger (51), and operating said other gas turbine (20), said heat exchanger submerged in a classical type fluid bed (50) through which flows a controlled partial flow of said hot bed material from the circulating flow circuit of said ACFBC steam generator (30), finally heating of said compressed air is performed by burning directly therein (24) gaseous or liquid fuel, operating said turbine unit with a back pressure provided by said exhaust gas from a power turbine part (22) as combustion air in said ACFBC steam generator (30) for generating therein superheated high pressure steam for said steam turbine unit (40).

2. A process according to claim 1, wherein said bed material is separated from a hot flue gas suspension, of said bed material, leaving the top of said combustion chamber (31) of said ACFBC steam generator (30) in two steps: a first "coarse step" (32) wherein the content of bed material in said flue gas suspension is decreased by 60-90%, and a "fine step" (33) wherein the content is reduced to less than 3% of the original content of said bed material in said suspension, said material from said "coarse step" (32) being introduced below the bed surface in said fluid bed (50) comprising the heat exchanger (51) and returned through overflows to the lower part of said combustion chamber (31) of said steam generator (30), said fluid bed (50) being fluidized with the aid of a small partial flow of said exhaust gas from said power turbine (22) of said back pressure gas turbine (20), said exhaust gas (53) from said fluid bed (50) being supplied to the combustion chamber (31) of said steam generator (30), and material from the "fine step" (33) is supplied to the fluidized pyrolysis bed (34) and from there returned to the lower part of the combustion chamber (31) of the steam generator (30) through an overflow.

3. A process according to claim 1, wherein said finely-divided solid fuel is injected into the lower part of said pyrolysis bed (34), said injection being performed with the aid of a gas which is essentially inert against the fuel, whereas the bed is stirred with gas of the same type and wherein raw pyro gas (35) produced in the bed is removed from the top thereof.

4. A process according to claim 1, wherein NH$_3$ formed in the pyrolysis of said solid fuel is recovered and that a controlled flow thereof is used for denoxing said exhaust gas from said pyro gas fired gas turbine unit (10), and for denoxing the flue gas from said ACFBC steam generator (30).

5. A process according to claims 1, wherein oil is supplied to the pyrolysis bed (34) as a complement to the volatile substances in the coal feed.

6. A process according to claim 2, wherein said finely-divided solid fuel is blown into the lower part of said pyrolysis bed (34), said injection being performed with the aid of a gas which is essentially inert against the fuel, whereas the bed is stirred with gas of the same type and wherein raw pyro gas (35) produced in said bed is removed from the top thereof.

7. A process according to claim 2, wherein NH$_3$ formed in the pyrolysis of said solid fuel is recovered and that a controlled flow thereof is used for denoxing said exhaust gas from said pyro gas fired gas turbine unit (10), and for denoxing said flue gas from said ACFBC steam generator (30).

8. A process according to claim 3, wherein NH$_3$ formed in said pyrolysis of solid fuel is recovered and that a controlled flow thereof is used for denoxing said exhaust gas from said pyro gas fired gas turbine unit (10), and for denoxing said flue gas from the ACFBC steam generator (30).

9. A process according to claim 6, wherein NH$_3$ formed in said pyrolysis of solid fuel is recovered and that a controlled flow thereof is used for denoxing said exhaust gas from said pyro gas fired gas turbine unit (10), and for denoxing the flue gas from the ACFBC steam generator (30).

10. A process according to claim 2, wherein oil is supplied to the pyrolysis bed (34) as a complement to the volatile substances in said solid fuel feed.

11. A process according to claim 3, wherein oil is supplied to the pyrolysis bed (34) as a complement to the volatile substances in said solid fuel feed.

12. A process according to claim 4, wherein oil is supplied to the pyrolysis bed (34) as a complement to the volatile substances in said solid fuel feed.

13. A process according to claim 3, wherein oil is supplied to the pyrolysis bed (34) as a complement to the volatile substances in the coal feed.

14. A process according to claim 6, wherein oil is supplied to the pyrolysis bed (34) as a complement to the volatile substances in said solid fuel feed.

15. A process according to claim 7, wherein oil is supplied to the pyrolysis bed (34) as a complement to the volatile substances in said solid fuel feed.

16. A process according to claim 12, wherein oil is supplied to the pyrolysis bed (34) as a complement to the volatile substances in said solid fuel feed.

17. A process according to claim 9, wherein oil is supplied to the pyrolysis bed (34) as a complement to the volatile substances in said solid fuel feed.

18. A process according to claim 1, wherein oil is supplied to the pyrolysis bed (34) as a complement to the volatile substances in said fossil coal feed.

19. A process according to claim 2, wherein oil is supplied to the pyrolysis bed (34) as a complement to the volatile substances in said fossil coal feed.

20. A process according to claim 3, wherein oil is supplied to the pyrolysis bed (34) as a complement to the volatile substances in said fossil coal feed.

21. A process according to claim 4, wherein oil is supplied to the pyrolysis bed (34) as a complement to the volatile substances in said fossil coal feed.

* * * * *